US007665198B2

(12) United States Patent
Cho et al.

(10) Patent No.: US 7,665,198 B2
(45) Date of Patent: Feb. 23, 2010

(54) METHOD OF REDUCING NOISE FOR A MODULAR FUEL INJECTOR WITH A HARMONIC ANNULAR DAMPER MEMBER

(75) Inventors: Yong D. Cho, Yorktown, VA (US); Massimlliano Cipriani, Cecina (IT)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 189 days.

(21) Appl. No.: 11/926,874

(22) Filed: Oct. 29, 2007

(65) Prior Publication Data

US 2008/0105762 A1 May 8, 2008

Related U.S. Application Data

(62) Division of application No. 10/859,608, filed on Jun. 3, 2004, now Pat. No. 7,431,226.

(51) Int. Cl.
*B23Q 17/00* (2006.01)

(52) U.S. Cl. .............. 29/407.05; 29/407.07; 29/407.08; 29/407.09; 29/888.01; 29/888.02; 239/533.1; 239/533.2; 239/533.4; 239/575; 239/590; 138/44; 138/45

(58) Field of Classification Search .............. 29/407.01, 29/407.05, 407.07, 407.08, 407.09, 407.1, 29/888.01, 888.02, 888.4; 239/553, 585–585.5, 239/575, 533.1–533.9, 590; 138/44, 45
See application file for complete search history.

(56) References Cited

U.S. PATENT DOCUMENTS 6,382,532 B1 * 5/2002 French et al. ............ 239/585.1
6,629,650 B2 * 10/2003 Curran et al. ............ 239/585.1

* cited by examiner

*Primary Examiner*—David P Bryant
*Assistant Examiner*—Bayan Salone

(57) ABSTRACT

A fuel injector with various embodiments of a annular damper member that reduces noise generated between a valve group subassembly and a power group subassembly during operation of the fuel injector. A mass annular damper member is also shown and described. A method of reducing sound in the valve group subassembly is also disclosed.

4 Claims, 2 Drawing Sheets

METHOD OF REDUCING NOISE FOR A MODULAR FUEL INJECTOR WITH A HARMONIC ANNULAR DAMPER MEMBER

This is a division filed pursuant to 35 U.S.C. §120 and §121 and claims the benefits of prior U.S. application Ser. No. 10/859,608, filed on Jun. 3, 2004 now U.S. Pat. No. 7,431,226.

BACKGROUND OF THE INVENTION

It is believed that some fuel injectors include features that reduce undesirable noise associated with operation of the fuel injector. For example, it has been known to locate a silencing chamber around the outlet end of the fuel injector. But this is believed to address noise caused by the expansion of gaseous fuel, not noise propagated by the actuator.

It is also known to provide a noise insulator formed in or around the fuel injector to prevent transmission of noise from the fuel injector. In one example, annular dampening elements also have been included as part of the fuel injector nozzle body, but at the fuel-metering section of the armature such that it is believed to be difficult to install, particularly post-manufacturing.

Another known example provides for a sound-dampening element formed unitarily as part of a fuel filter. The sound-dampening element, however, is believed to absorb noise propagating between the fuel injector and a fuel rail instead of damping the structure to reduce the vibration or noise.

SUMMARY OF THE INVENTION

The present invention provides for, in one aspect, a fuel injector. The fuel injector includes a body, filter, and damper. The body extends along a longitudinal axis between an inlet end and an outlet end with a flow passage extending therebetween. The filter can be disposed in the flow passage proximate the inlet end. The annular damper member secured to the flow passage between the inlet end and the filter. The annular damper member has an outer surface cincturing an inner surface about the longitudinal axis between first and second terminus to define an aperture to permit fluid communication between the inlet end and the filter. The first and second terminus are spaced apart at a first distance less than a second distance between the longitudinal axis and the inner surface of the annular damper member.

In another aspect, the present invention provides an annular damper member for use in a tubular passage of a fuel injector. The annular damper member includes an outer surface cincturing an inner surface about a longitudinal axis that extends between a first end and a second end. The inner and outer surfaces terminate in first and second terminus to define an aperture that permits fluid communication between the first and second ends. The first and second terminus are spaced apart at a first distance less than a second distance between the longitudinal axis and the inner surface of the annular damper member.

In yet another aspect, the present invention provides for a method of maintaining operational noise of a fuel injector at a predetermined noise level. The fuel injector has a body extending along a longitudinal axis and a valve group subassembly. The valve group subassembly includes an inlet tube having a portion disposed within the body. The method can be achieved by reducing the amplitude of vibration of the inlet tube being transmitted across an annular gap formed between an outer circumferential portion of the inlet tube and the body during operation of the fuel injector with a damper member disposed in the inlet tube, the damper member having an outer surface cincturing an inner surface about the longitudinal axis between first and second terminus to define an aperture to permit fluid communication between the inlet end and the filter, the first and second terminus being spaced apart at a first distance less than a second distance between the longitudinal axis and the inner surface of the annular damper member; and quantifying the reduction of the amplitude of vibration as noise level output.

BRIEF DESCRIPTIONS OF THE DRAWINGS

The accompanying drawings, which are incorporated herein and constitute part of this specification, illustrate an embodiment of the invention and, together with the general description given above and the detailed description given below, serve to explain the features of the invention.

DETAILED DESCRIPTION OF THE PREFERRED EMBODIMENTS

Figure 1:
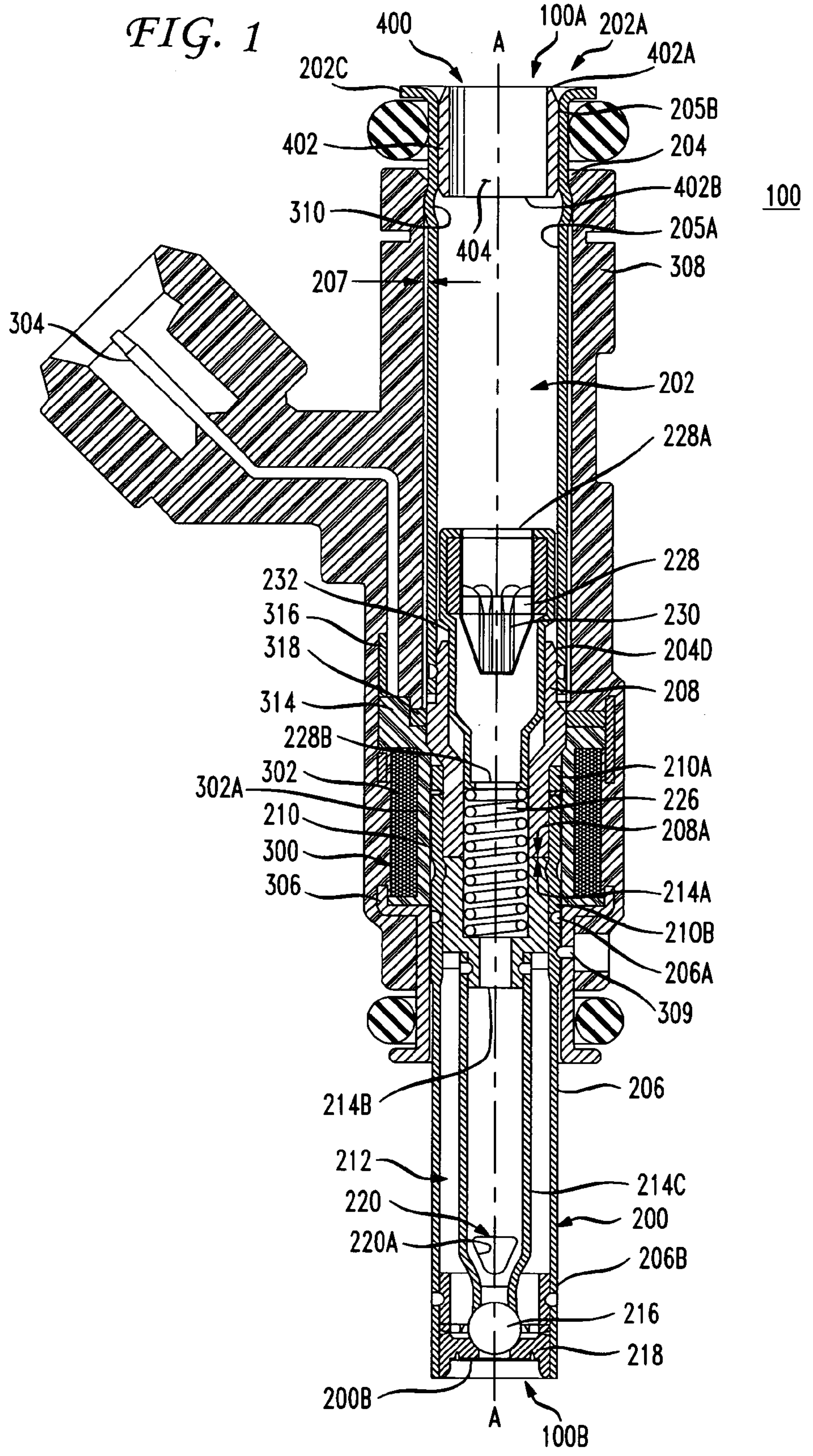
FIG. 1 is a representation of a fuel injector according to a preferred embodiment.
Figure 2:
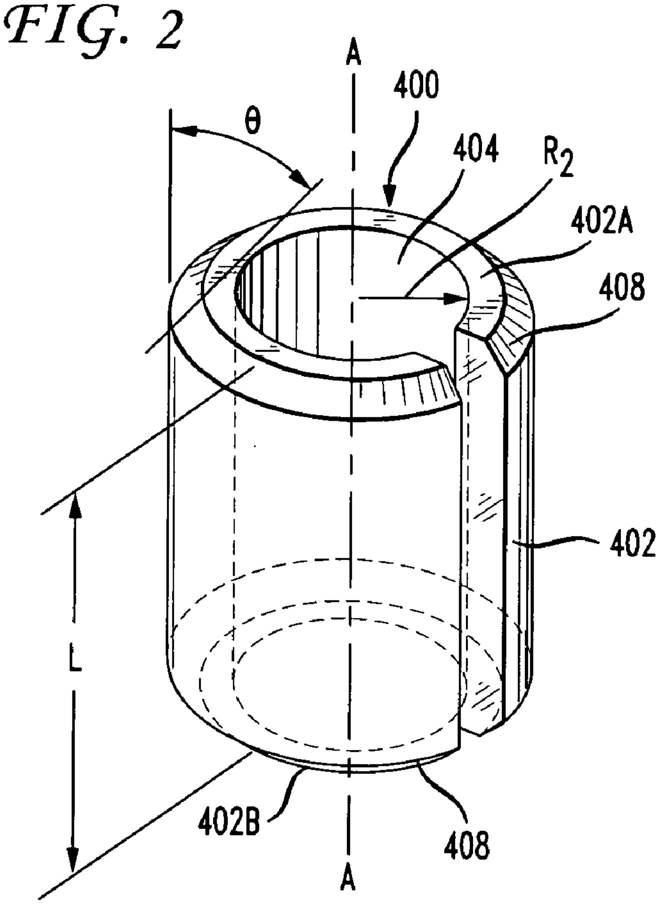
FIG. 2 is an isometric view of another preferred embodiment of the harmonic damper.
Figure 3:
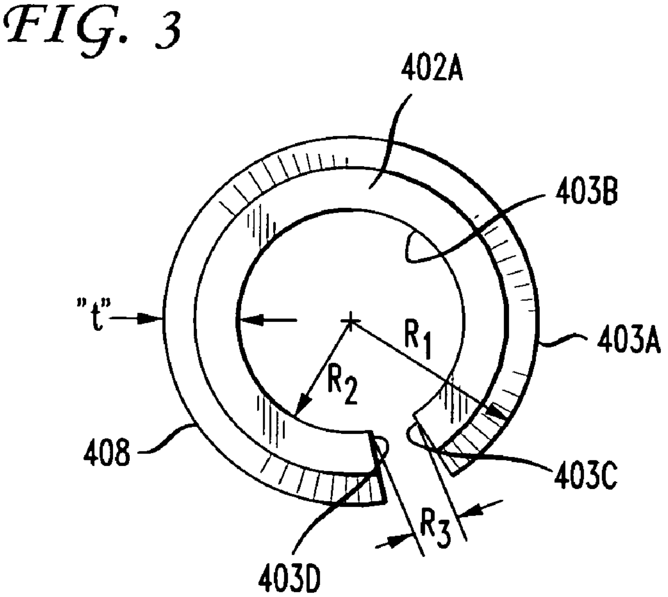
FIG. 3 is a plan view of a harmonic damper for the fuel injector of FIG. 1.

FIGS. 1-3 illustrate preferred embodiments. Referring to FIG. 1, a solenoid actuated fuel injector 100 dispenses a quantity of fuel to be combusted in an internal combustion engine (not shown). The fuel injector 100 extends along a longitudinal axis A-A between a first injector end 100A and a second injector end 100B, and includes a valve group subassembly 200, a power group subassembly 300 and a harmonic annular damper member 400. The valve group subassembly 200 performs fluid-handling functions, e.g., defining a fuel flow path and prohibiting fuel flow through the injector 100 when a closure member 216 is not actuated. The power group subassembly 300 performs electrical functions, e.g., converting electrical signals to a driving force for permitting fuel flow through the injector 100. The harmonic annular damper member 400 performs a noise reduction function, e.g., attenuating vibrations being transmitted through the fuel injector and therefore reduces acoustic noise emanating from the fuel injector.

The valve group subassembly 200 includes a tube assembly 202 extending along the longitudinal axis A-A between a first tube assembly end 202A and a second tube assembly end 202B. The tube assembly 202 can include at least an inlet tube 204, a non-magnetic shell 210 and a valve body 206. The inlet tube 204 has a first inlet tube end 202A. The inlet tube 204 has an inner surface 205A and an outer surface 205B spaced apart from the inner surface 205A over a generally constant thickness. A second inlet tube end 204D of the inlet tube 204 can be connected to a pole piece 208, and the pole piece 208 is connected to a first shell end 210A of a non-magnetic shell 210. A second shell end 210B of the non-magnetic shell 210 can be connected to a generally transverse planar surface of a first valve body end 206A of the valve body 206. A second valve body end 206B of the valve body 206 can be disposed proximate the second tube assembly end 202B. A pole piece can be integrally formed at the second inlet tube end 204D of the inlet tube 204 or, as shown, a separate pole piece 208 can be connected to the inlet tube 204 and connected to the first shell end 210A of the non-magnetic shell 210. Preferably, the components of the valve subassembly are steel.

An armature assembly 212 can be disposed in the tube assembly 202. The armature assembly 212 includes a first armature assembly end having a ferro-magnetic or "armature" portion 214 and a second armature assembly end having a sealing portion. The armature assembly 212 can be disposed in the tube assembly 202 such that the magnetic portion 214A confronts a face portion 208A of a face portion 208A of the pole piece 208.

Fuel flow through the armature assembly 212 can be provided by at least one axially extending through-bore 214B and at least one aperture 220 through a wall of the armature assembly 212. The apertures 220 provide fluid communication between the at least one through-bore 214B and the interior of the valve body 206.

A resilient member 226 can be disposed in the tube assembly 202 and biases the armature assembly 212 toward a seat 218. A filter assembly 228 includes a filter 230. A preload adjuster 232 is also disposed in the tube assembly 202. The filter assembly 228 includes a first filter assembly end 228A and a second filter assembly end 228B. The filter 230 can be disposed at one end of the filter assembly 228 and is also located proximate the harmonic annular damper member 400 at the first end 200A of the tube assembly 202, and apart from the resilient member 226. The preload adjuster 232 can be disposed generally proximate the second end 200B of the tube assembly 202. The preload adjuster 232 engages the resilient member 226 and adjusts the biasing force of the member 226 with respect to the pole piece 208.

The valve group subassembly 200 can be assembled as follows. The non-magnetic shell 210 can be connected at respective distal ends of the shell 210 to the pole piece 208 and to the valve body 206. The filter assembly 228 can be inserted along the axis A-A from the first end 202A of the tube assembly 202. Next, the resilient member 226 and the armature assembly 212 (which was previously assembled) are inserted along the axis A-A from the valve group subassembly end 202B of the valve body 206. Other preferred variations of the valve group subassembly 200 are described and illustrated in U.S. Pat. No. 6,676,044, issued on 13 Jan. 2004, which is hereby incorporated by reference in its entirety.

The power group subassembly 300 includes an electromagnetic coil 302, at least one terminal 304, flux washer 318, a coil housing 306 and an overmold 308. The electromagnetic coil 302 includes a wire 302A that can be wound on a bobbin 314 and electrically connected to electrical contacts 316 on the bobbin 314. When energized, the coil 302 generates magnetic flux that moves the armature assembly 212 toward the open configuration, thereby allowing the fuel to flow through the openings 214B and 220, the orifice of the seat 218 and the outlet end 202B. De-energization of the electromagnetic coil 302 allows the resilient member 226 to return the armature assembly 212 to the closed configuration, thereby shutting off the fuel flow. The coil housing 306, which provides a return path for the magnetic flux, generally includes a ferro-magnetic cylinder surrounding the electromagnetic coil 302, and a flux washer 318 extending from the cylinder toward the axis A-A.

The coil 302 can be constructed as follows. A plastic bobbin 314 can be molded with at least one electrical contact 316. The wire 302A for the electromagnetic coil 302 can be wound around the plastic bobbin 314 and connected to the electrical contacts 316. The coil housing 306 is then placed over the electromagnetic coil 302 and bobbin 314. A terminal 304, which can be pre-bent to a proper shape, is then electrically connected to each electrical contact 316. An overmold 308 is then formed to maintain the relative assembly of the coil/bobbin unit, coil housing 306 and terminal 304. The overmold 308 also provides a structural case for the injector and provides predetermined electrical and thermal insulating properties. Preferably, the overmold 308 is a Nylon 6-6 material. Other preferred embodiments of the power group subassembly 300 are described and illustrated in U.S. Pat. No. 6,676,044, issued on 13 Jan. 2004, which is hereby incorporated by reference in its entirety.

The valve group subassembly 200 can be inserted into the power group subassembly 300 to form the fuel injector 100. The inserting of the valve group subassembly 200 into the power group subassembly 300 can involve setting the relative rotational orientation of valve group subassembly 200 with respect to the power group subassembly 300. Once the desired orientation is achieved, the subassemblies are inserted together. After inserting the valve group subassembly 200 into the power group subassembly 300, these two subassemblies are affixed together by a first securement 309 and a second securement 310. The first securement 309 can be by a suitable technique such as, for example, by welding or laser welding. The second securement 310 can also be by a suitable technique such as, for example, crimping a portion of the inlet tube 204 so that an annular gap 207 can be formed between the outer wall 205B of a portion of the inlet tube 204 and the overmold 308. The first injector end 100A can be coupled to the fuel supply of an internal combustion engine (not shown). Fuel rail (not shown) can be supplied to the tube assembly 202.

A harmonic annular damper member 400 can be secured in the tube assembly 202 of the valve group subassembly 200 proximate first tube end 202A. As illustrated in FIGS. 2 and 3, harmonic annular damper member 400 includes a damper body 402 having a first damper end 402A with a face portion, a second damper end 402B with a face portion. The damper body 402 has outer and inner surfaces 403A, 403B cincturing the longitudinal axis. The inner and outer surfaces 403B and 403A can be spaced apart over a thickness "t" in the range of about one (1.0) millimeters to about three (3.0) millimeters. The outer surface 403A can be spaced apart from the longitudinal axis A-A over a distance R1 and the inner surface 403B can be spaced apart from the longitudinal axis A-A over a distance R2. The outer and inner surfaces 403A and 403B terminate at respective terminus surface 403C and 403D so that the terminus 403C and 403D are spaced apart over a minimum distance R3 where R3 is less than either of R1 or R2. The damper body 402 extends over a length L along the longitudinal axis A-A. Preferably, the distance R1 is about 7.2 millimeters, R2 is about 3.6 millimeters, thickness t is about 1.8 millimeters, R3 is about 2.0 millimeters and the length L is about 9 millimeters.

Damper body 402 can be beveled at either or both of ends 402A and 402B so that the beveled surface 408 extends at an angle θ. The angle θ is preferably about 15 degrees with respect to the longitudinal axis A-A. An aperture 404 can be disposed longitudinally through the center of damper body 402. Damper body 402 may be formed from any high-density material such as, for example, a mass density of 2700 kg/$m^3$ or greater. Preferably, such material can include stainless steel, carbon steel, brass, bronze, lead, titanium, or other metallic or metallic alloys materials with a mass of about 1.5 or 1.65 grams.

The harmonic annular damper member 400 is believed to reduce the radiated acoustic sound produced during operation of the fuel injector. When the fuel injector opens and closes, the armature assembly 212 impacts the pole piece 208 and seat 218 of the fuel injector. This impact is believed to create sharp impulses that cause the tube assembly to vibrate in the overmold 308. The vibrations are believed to be amplified through the tube assembly 202 and transferred to the overmold 308 of the power group subassembly 300 across the annular gap 207. Consequently, it is believed that the vibrations of the overmold 308 are transmitted to the air and cause the perceived noise. In particular, by providing a contact surface area of about 75% of the "external" surface area of the annular damper member 404, the annular damper member 400 can be mechanically secured via a press-fit to the inlet tube 204 at a particular location on the inner surface of the inlet tube 204 such that the inlet tube 204 (and the valve subassembly 200) has an increase in the mass. The increase in the mass of a specified structure of the fuel injector is believed to dampen or attenuate vibrations transmitted through the valve subassembly 200 and power subassembly 300. That is, the addition of a specified mass to the valve subassembly 200 (at a particular location in the fuel injector) is believed to stiffen the fuel injector structure against vibrations, i.e., by increasing the effective mass of the subassembly. By increasing the mass of the structure, the amplitude of the vibrations or the resonant frequency of the fuel injector is modified such that the vibrations (due to the impacts of the armature closing and opening) are damped, modified, or reduced in its intensity so that acoustic noise perceivable by the human ear is reduced.

In the preferred embodiments, the "external" surface area of the annular damper member includes the sum of the surface area of the first and second ends 402A, 402B (minus the area of the aperture), the beveled portions 408, and the circumferential outer surface area 403A of the body 402. Coincidentally, the contact portion (i.e., the portion in surface contact with the inlet tube via the press-fit) in FIG. 2 is the circumferential surface area, which is approximately 75% of the external surface area.

A suitable tool (not shown) can be used to install the annular damper member into the inlet tube. By virtue of a split ring configuration of the harmonic damper 400, damage to the inlet tube 204 during the press-fit can be reduced as the terminus faces 403C and 403D can be moved toward each other so that the distance R3 in the press-fitted and installed configuration in the inlet is less than the distance R3 in the uninstalled configuration.

Preferably, the harmonic damper 400 is press-fitted in the tube assembly 202 along axis A-A at first tube end 202A so that first end 402A is generally flush with the outermost surface of tube assembly 202 such as, for example, flange 202C. Preferably, the mass of the inlet tube is increased at least 46% by the addition of the damper 400. In one preferred embodiment of the inlet tube 202, the mass of the inlet tube is increased by about 100%. In a longer length of the preferred embodiment of the inlet tube 202, the mass of the inlet tube is increased by about 61%. In yet a longer length of the preferred embodiment of the inlet tube 202, the mass of the inlet tube is increased by about 46%. As used herein, "press-fit" means the application of assembly pressure adequate to provide a permanent connection to locate the damper body in a stationary position with respect to the inlet tube 204. Further, the term, "approximately" denotes a suitable level of tolerance that permits the annular damper member 400 to be press fitted into tube assembly 202 without causing distortion to the inlet tube 204 or overmold 308 that would negatively affect the ability of the fuel injector to meter fuel.

According to another preferred embodiment, two or more harmonic annular damper members 400 can be disposed in the tube assembly 202. It is believed that the increase in the mass of specific components of the valve subassembly 200 at least attenuates the resonant frequency of the various components of the fuel injector, or even to shift or eliminate acoustical nodes formed on the surface of the inlet tube, armature, valve body, or overmold.

In operation, the electromagnetic coil 302 is energized, thereby generating magnetic flux in the magnetic circuit. The magnetic flux moves armature assembly 212 (along the axis A-A, according to a preferred embodiment) towards the pole piece 208, closing the working air gap. This movement of the armature assembly 212 separates the closure member 216 from the seat 218 and allows fuel to flow from the fuel rail (not shown), through the inlet tube 204, the through-bore 214B, the apertures 220A and the valve body 206, between the seat 218 and the closure member 216, and through the opening into the internal combustion engine (not shown). When the electromagnetic coil 302 is de-energized, the armature assembly 212 is moved by the bias of the resilient member 226 to contiguously engage the closure member 216 with the seat 218, and thereby prevent fuel flow through the injector 100.

It is believed that the preferred embodiment reduces the peak amplitude of the impulse transmitted from the tube assembly to the overmold due to the increased mass of the fuel injector provided by the harmonic annular damper member on the inlet tube. As used herein, the damping of vibration to reduce noise is quantifiable as an average decrease in measured sound level of at least 1 decibel-A ("dBA," as measured on the "A" scale of a sound level meter specified under ANSI, type 2, ASNI, S1.4 (1971) on a slow response mode, or on a scale that approximates human hearing response).

It is believed that another advantage of disposing the harmonic annular damper member in the inlet tube of the fuel injector is to allow post-manufacturing installation and adjustment of the harmonic annular damper member should a fuel injector similar to the preferred embodiment generate a noise perceived to be undesirable by, e.g., a vehicle driver.

Whether installed in the fuel injector during manufacturing or post-manufacturing, it is believed that the harmonic annular damper member can measurably reduce undesirable noise created by vibrations between the valve group and the power group subassemblies during fuel injection operation.

To evaluate whether the preferred harmonic annular damper member for a fuel injector according to the preferred embodiments would provide adequate noise reduction, testing was performed to compare the known fuel injector noise levels with those in the preferred embodiment. Acoustic sound testing was conducted on a sample fuel injector utilizing sound measurement equipment while the fuel injector is operated according to Society of Automotive Engineers Testing Standard for Low Pressure Gasoline Fuel Injector J1832 (February 2001), which Testing Standard is incorporated by reference into this application.

The sound test procedure includes placing the sample fuel injector without a harmonic annular damper member in an anechoic chamber approximately 0.66×0.66×0.66 meters in size; placing two free-field B&K® Model No. 4190 ½-inch microphones approximately 0.4 meters from the middle of the longitudinal axis A-A of the fuel injector; with one microphone placed perpendicular to the longitudinal axis A-A and the other microphone placed at a 45° angle to the axis; forcing a test fluid such as, for example, heptane or preferably water or preferably water through the fuel injector under 400 KPa of pressure; actuating the electromagnetic solenoid at a duty cycle of 4%; and sampling sound through the microphones for an average of 10 seconds. A fuel exit hose was placed around the discharge end of the fuel injector to reduce any noise created by the fuel injector spray from affecting the noise level.

Each acoustic sound test was repeated using a sample fuel injector equipped with a single harmonic annular damper member according to the preferred embodiments. Further, multiple tests were performed for each sample fuel injector. Accordingly, the harmonic annular damper member sample test results are compared with the "base line" sample fuel injector results.

It is believed that this test procedure is applicable as one technique of verifying noise level in a laboratory setting. It is also believed that noise levels for a fuel injector as installed in a vehicle are even lower than as measured in the test chamber due to the interaction of multiple fuel injectors, fuel rail damper and pressure regulator, the vehicle fuel rail, intake manifold and other engine components.

A summary of the acoustic sound test results according to the test procedure is provided in Table 1 below. As shown in Table 1, use of a harmonic annular damper member according to the preferred embodiments reduced noise in the fuel injector from 1.10 to 1.50 dBA on average.

TABLE 1

| | HARMONIC ANNULAR DAMPER MEMBER SOUND TEST RESULTS | | | |
|---|---|---|---|---|
| Injector Sample | Baseline Sound (dBA) | Sound with Harmonic Annular damper member (dBA) | Delta (dBA) | Sample Qty |
| A | 51.7 | 50.2 | −1.50 | 10 |
| B | 51.9 | 50.4 | −1.50 | 4 |
| C | 52.1 | 51.0 | −1.10 | 48 |
| D | 52.0 | 50.7 | −1.29 | 22 |

As shown in Table 1, a series of 10 sound tests performed on a sample A fuel injector resulted in an average sound reduction of 1.50 dBA. Similar results were obtained from a series of 4 tests on a sample B. A series of 48 tests on a sample C fuel injector resulted in an average reduction of 1.10 dBA. A series of 22 tests on a sample D fuel injector resulted in an average reduction of 1.29 dBA. The reduction of at least one dBA in this test procedure is believed to be greater than expected in the fuel injector of the preferred embodiments.

Moreover, the reduction in noise level confirms the ability of the damper to attenuate noise in a fuel injector of the preferred embodiments. And it is believed that by reducing noise to a level at preferably about 51 dBA or lower, the subjective perception of the reduction in undesirable noise is greater than if the noise were at higher levels.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What we claim is:

1. A method of maintaining operational noise of a fuel injector at a predetermined noise level, the fuel injector having a body extending along a longitudinal axis and a valve group subassembly, the valve group subassembly including an inlet tube having a portion disposed within the body, the method comprising:

reducing the amplitude of vibration of the inlet tube being transmitted across an annular gap formed between an outer circumferential portion of the inlet tube and the body during operation of the fuel injector with a damper member disposed in the inlet tube, the damper member having an outer surface cincturing an inner surface about the longitudinal axis between first and second terminus to define an aperture to permit fluid communication between an inlet end of the fuel injector and a filter, the first and second terminus being spaced apart at a first distance less than a second distance between the longitudinal axis and the inner surface of the annular damper member; and quantifying the reduction of the amplitude of vibration in the form of a standardized measured noise level output.

2. The method of claim 1, wherein the reducing comprises increasing the mass of at least one stationary component of the valve group assembly.

3. The method of claim 2, wherein the at least one component of the valve group assembly comprises the inlet tube.

4. The method of claim 2, wherein the quantifying comprises:

measuring the average sound level produced by the fuel injector by a sound level meter in decibel-A-weighted (dBA) mode, while the fuel injector is operated according to the Society of Automotive Engineers Testing Standard for Low Pressure Gasoline Fuel Injector J1832 (Feb. 2001) with and without the reducing of the amplitude of vibration; and verifying a reduction in noise output of the fuel injector of at least 1.0 dBA.

* * * * *